US011668377B2

(12) United States Patent
Engel et al.

(10) Patent No.: US 11,668,377 B2
(45) Date of Patent: Jun. 6, 2023

(54) THREADED NUT FOR A BALL SCREW DRIVE

(71) Applicant: SCHAEFFLER TECHNOLOGIES AG & CO. KG, Herzogenaurach (DE)

(72) Inventors: Juergen Engel, Adelsdorf (DE); Andreas Hoefler, Heroldsberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 67 days.

(21) Appl. No.: 16/462,797

(22) PCT Filed: Nov. 27, 2017

(86) PCT No.: PCT/DE2017/101023
§ 371 (c)(1),
(2) Date: May 21, 2019

(87) PCT Pub. No.: WO2018/099516
PCT Pub. Date: Jun. 7, 2018

(65) Prior Publication Data
US 2019/0383370 A1    Dec. 19, 2019

(30) Foreign Application Priority Data
Nov. 29, 2016   (DE) ............... 10 2016 223 610.5

(51) Int. Cl.
*F16H 25/20* (2006.01)
*F16H 25/22* (2006.01)
*F16H 25/24* (2006.01)

(52) U.S. Cl.
CPC ......... *F16H 25/2214* (2013.01); *F16H 25/24* (2013.01)

(58) Field of Classification Search
CPC .. F16H 25/2214; F16H 25/24; F16H 25/2228; F16H 25/2204; F16H 25/2219
See application file for complete search history.

(56) References Cited

U.S. PATENT DOCUMENTS

| 3,124,969 | A | * | 3/1964 | Grabowski et al. ..................... F16H 25/2209 74/441 |
| 3,170,336 | A | * | 2/1965 | Bohnhoff ............ F16H 25/2219 74/424.86 |

(Continued)

FOREIGN PATENT DOCUMENTS

| CN | 201858320 | | 6/2011 | |
| DE | 102006053244 A1 | * | 5/2008 | ........... B62D 5/0448 |

(Continued)

OTHER PUBLICATIONS

International Search Report for International Application No. PCT/DE2017/101023 dated Mar. 13, 2018.

*Primary Examiner* — Zakaria Elahmadi

(57) ABSTRACT

A threaded nut for a ball screw drive is provided. The threaded nut includes a cylindrical central piece ending at a flange. A deflecting body is attached to the cylindrical central piece and is configured to recirculate balls during operation of the threaded nut. A pin fixes the deflecting body to the flange. In embodiments, the flange and the deflecting body each have recesses that are aligned with one another, and the pin extends through those recesses.

17 Claims, 4 Drawing Sheets

(56) References Cited

U.S. PATENT DOCUMENTS

| | | | | |
|---|---|---|---|---|
| 3,791,232 | A * | 2/1974 | Helmer | F16H 25/2209 74/424.86 |
| 4,074,585 | A * | 2/1978 | Richaud | F16H 25/2219 74/424.87 |
| 4,211,125 | A * | 7/1980 | Benton | F16H 25/2219 74/424.82 |
| 4,369,011 | A * | 1/1983 | Ploss | F16B 39/12 411/223 |
| 4,557,156 | A * | 12/1985 | Teramachi | B23Q 5/40 74/424.86 |
| 4,795,172 | A * | 1/1989 | Brande | F16H 25/2418 277/354 |
| 4,864,883 | A * | 9/1989 | Mayfield | F16H 25/2219 74/424.87 |
| 5,154,091 | A * | 10/1992 | Bianco | F16H 25/2219 74/424.86 |
| 5,193,409 | A * | 3/1993 | Babinski | F16H 25/2219 74/424.83 |
| 5,492,036 | A * | 2/1996 | Sato | F16H 25/2219 74/89.36 |
| 5,704,249 | A * | 1/1998 | Krauska | A47C 20/042 403/366 |
| 6,158,720 | A * | 12/2000 | Patrick | B66F 3/18 254/103 |
| 6,425,302 | B2 * | 7/2002 | Greubel | F16H 25/2214 74/424.82 |
| 6,464,034 | B1 * | 10/2002 | Toda | B62D 5/0448 180/444 |
| 6,941,831 | B2 * | 9/2005 | Ohkubo | F16H 25/2219 74/424.86 |
| 7,520,193 | B2 * | 4/2009 | Chen | F16H 25/2214 74/424.82 |
| 7,523,682 | B2 * | 4/2009 | Liao | F16H 25/2214 74/424.83 |
| 8,127,884 | B2 * | 3/2012 | Asakura | B62D 5/0448 180/444 |
| 8,261,627 | B2 * | 9/2012 | Miyahara | F16H 25/2219 74/424.86 |
| 8,511,896 | B2 * | 8/2013 | Shirai | F16H 25/2418 384/15 |
| 8,701,834 | B2 * | 4/2014 | Jacob | F16H 57/0471 184/6.12 |
| 8,893,574 | B2 * | 11/2014 | Pan | F16H 25/2219 74/424.87 |
| 9,145,958 | B2 * | 9/2015 | Jeng | F16H 25/2006 |
| 9,261,179 | B2 * | 2/2016 | Jiang | F16H 25/2418 |
| 9,279,487 | B1 * | 3/2016 | Guglietti | F16H 25/2209 |
| 9,920,822 | B2 * | 3/2018 | Jeng | F16H 25/2214 |
| 10,088,034 | B2 * | 10/2018 | Fang | F16H 25/24 |
| 10,648,546 | B2 * | 5/2020 | Kai | F16H 25/2219 |
| 2004/0211280 | A1 * | 10/2004 | Nishimura | F16H 25/2219 74/424.82 |
| 2008/0210038 | A1 * | 9/2008 | Minakuchi | F16H 25/2204 74/424.87 |
| 2009/0084212 | A1 * | 4/2009 | Niwa | F16H 25/2223 29/898.067 |
| 2010/0132494 | A1 * | 6/2010 | Sugita | F16H 25/2214 29/592 |
| 2010/0242653 | A1 * | 9/2010 | Adler | F16H 25/2214 74/424.87 |
| 2013/0220046 | A1 * | 8/2013 | Chen | F16H 25/2219 74/424.87 |
| 2013/0228026 | A1 * | 9/2013 | Rupp | F16H 25/24 74/89.23 |
| 2014/0033590 | A1 * | 2/2014 | Gomez | F41A 21/48 42/75.02 |
| 2015/0260267 | A1 * | 9/2015 | Hsieh | F16H 25/24 74/89.36 |
| 2017/0159778 | A1 * | 6/2017 | Jeng | F16H 25/2006 |
| 2017/0349205 | A1 * | 12/2017 | Kaneko | B62D 5/0448 |
| 2019/0263443 | A1 * | 8/2019 | Illes | F16C 19/183 |

FOREIGN PATENT DOCUMENTS

| | | |
|---|---|---|
| DE | 102007049114 A1 | 4/2009 |
| DE | 102009050802 A1 | 4/2011 |
| DE | 102013200873 A1 | 8/2014 |
| DE | 102014204562 A1 | 9/2015 |
| DE | 102015204069 A1 | 9/2016 |
| EP | 1559929 A2 | 8/2005 |
| JP | 2004-176826 A | 6/2004 |
| JP | 2009103201 A | 5/2009 |

* cited by examiner

THREADED NUT FOR A BALL SCREW DRIVE

CROSS-REFERENCE TO RELATED APPLICATIONS

This application is the U.S. National Phase of PCT/DE2017/101023 filed Nov. 27, 2017, which claims priority to DE 102016223610.5 filed Nov. 29, 2016, the entire disclosures of which are incorporated by reference herein.

TECHNICAL FIELD

This disclosure relates to a threaded nut suitable for a ball screw drive, which has at least one deflecting body for ball recirculation.

BACKGROUND

A ball screw drive with ball recirculation is known for example from DE 10 2014 204 562 A1. A threaded nut of this ball screw drive has a female part upon which several deflection elements are arranged distributed on the circumference. The deflection elements are connected to one another via a retaining pin. Deflection connectors of the deflection elements engage in deflection openings of the female part, which elements reach the inner circumference of the female part.

From DE 10 2007 049 114 A1 a toothed belt wheel of an electro-mechanical steering system with a ball screw drive is known. In addition to its function within a belt drive, this toothed belt wheel assumes the function of radially fixing ball deflection housings in position on a ball screw nut.

A further threaded nut built in several parts is for example disclosed in DE 10 2015 204 069 B4. Here a nut add-on piece has an anti-twist contour which is provided for cooperation with a housing of a spindle drive.

SUMMARY

This disclosure addresses a problem of improving a threaded nut designed for a ball screw drive with ball recirculation vis-à-vis the mentioned prior art, in particular with regard to production technology aspects.

In accordance with the disclosure, this problem is solved by a threaded nut with the features of the claims. At least one deflecting body is placed on a central piece on the inside of the threaded nut provided with at least one thread, which is provided for the recirculation of rolling elements, specifically balls. On one of its front sides the central piece can transition in one piece to a flange, wherein in recesses of the flange and of the deflection piece that mutually aligned a pin fixing the deflecting piece on the flange and thus also on the central piece of the threaded nut is inserted. Precisely one pin can be inserted in the circumferential direction of the deflecting body on its front side in the middle.

The recess in the flange, into which the pin fixing the deflecting body can be inserted, can be a bore, which can additionally be used as a reference bore, that is, a so-called search bore. Hence a single contour, specifically bore, of the flange fulfills multiple functions without additional production technology expenditure.

While the recess located in the flange, into which the pin is inserted, can be present as a bore in all designs of the threaded nut, the associated recess in the deflection piece is either also a bore or a groove aligned in the axial direction of the threaded nut. If the recess is a groove, it can either reach to the front side of the deflecting body or be spaced apart from the front side by a notch, which has an enlarged cross-section in comparison to the groove. The notch establishes an axial distance between the retainer of the pin in the flange on the one hand, and in the deflecting body on the other hand. For one thing, this results in a tolerance bridging; for another, this enables elastic/flexible properties of the pin to be utilized, in order to improve the acoustic properties of the ball screw drive, in particular to prevent rattling sounds.

In the same vein, a flexible, both in the sense of a tolerance compensation as well as with respect to the acoustic properties, advantageous connection of the deflecting body to the flange can also be realized due to the fact that the notch in the deflection piece is at least partially conically shaped, that is broadens to the front side of the deflection piece. This applies both for a groove-shaped recess as well as for a recess in the form of a bore.

The pin can for example can have the shape of a parallel-grooved pin, The parallel-grooved pin for example has a shape specified in the DIN 1473 standard, which describes a pin having a parallel groove extending longitudinally relative to a length of the pin. Regardless of the shape of the pin it can be inserted into a continuous recess in axial direction or into a recess having only a limited depth, in particular being present as a blind hole in the deflection piece. In the disassembly of the threaded nut the pin accordingly can either be pushed out on a single front side or on each front side. Recesses on opposing front sides of the deflecting body can be shaped similarly.

According to one possible embodiment, a pulley is molded on the front side of the central piece opposite the flange. The threaded nut acts in this case as a rotating element of a ball screw drive, while the associated threaded spindle can be linear displaced in rotationally locked manner. Likewise, designs can be realized in which the threaded nut is displaceably rotationally locked within a surrounding structure and displaceable by the rotation of the associated threaded spindle.

If the central piece of the threaded nut is encompassed by several, in particular two, deflection pieces, the deflection pieces, also referred to as deflecting bodies, collide in the circumferential direction of the threaded nut in a connectionless manner, for example. The connectionless contact between the deflection pieces means that none of the elements connecting the deflection pieces to each other are present in the circumferential direction of the threaded nut. In this way, geometric changes of components of the threaded nut occurring in the operation of the ball screw drive, said components undergoing these changes thermally induced and/or load induced, can be absorbed without impairing the function of the ball screw thread.

The threaded nut is ideal in particular for use in a ball screw thread of an electro-mechanical steering system. Likewise, the threaded nut is ideal for ball screw drives in stationary applications, for example in building technology.

BRIEF DESCRIPTION OF THE DRAWINGS

Subsequently, several exemplary embodiments of the disclosure will be described in greater detail on the basis a drawing. The figures show the following.

DETAILED DESCRIPTION OF THE DRAWINGS

Figure 1:
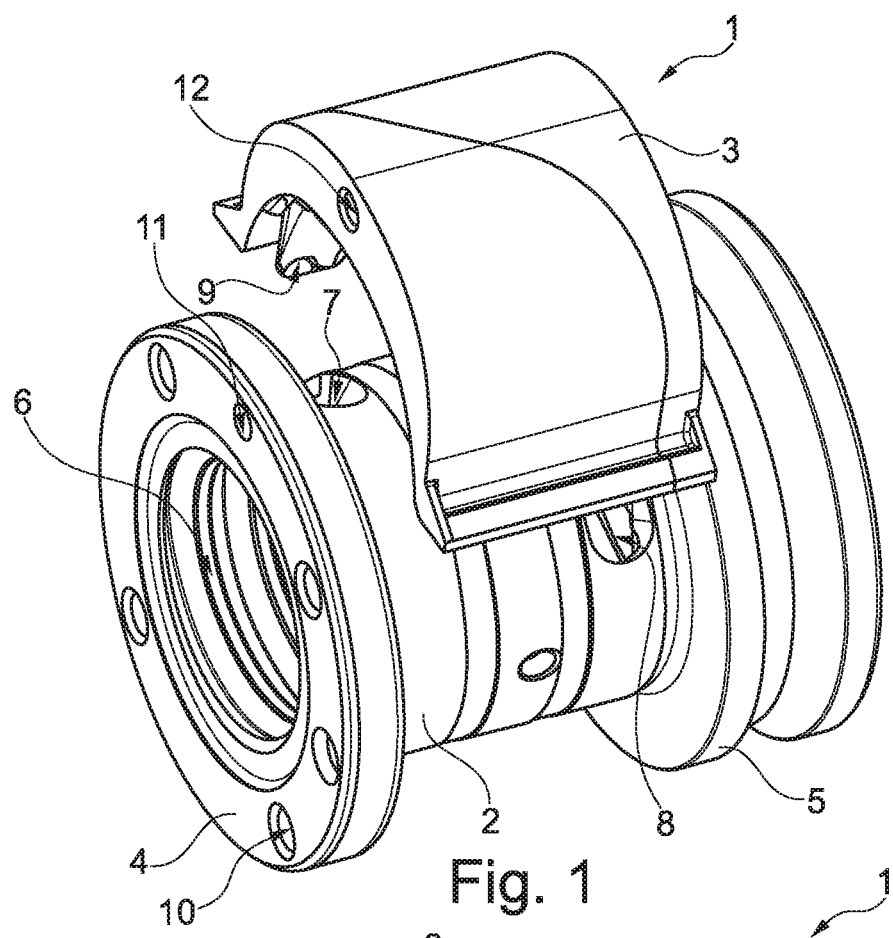
FIGS. 1 to 3 show a first exemplary embodiment of a threaded nut in different assembly states.

The following explanations, unless otherwise specified, refer to all the exemplary embodiments. Corresponding parts or parts fulfilling the same function are marked with the same reference numeral in all of the figures.

A threaded nut 1 built in multiple parts is provided for use in a ball screw drive with ball recirculation.

The threaded nut 1 has a cylindrical basic shape, wherein a deflecting body 3 also referred to as a deflection piece is placed on a central piece 2 of the threaded nut 1 for ball recirculation. Adjoining the central piece 2 on the front side are, on the one hand, a flange 4 and on the other hand, a pulley 5. A thread is labeled 6, in which balls roll in the case of a completed ball screw drive. Ball passages in the central piece 2, which represent channels open to the deflecting body 3, are labeled 7 and 8. Deflection connectors 9, which are molded on the deflecting body 3, engage in the ball passages 7 and 8.

The flange 4 has several connecting bores 10 for connecting the threaded nut 1 to additional components which are not depicted in the figures. In addition, there is a bore 11 in the flange 4, which is also referred to as a locking bore. The locking bore 11 aligns with a recess 12, 14 in the deflecting body 3 when the threaded nut 1 is assembled.

A pin 13 is inserted into the locking bore 11, which depicts a first recess, and into the recess 12, 14 aligned with it, said pin fixing the deflecting body 3 on the flange 4 and hence also on the one-piece central piece 2 connected to the flange 4. In corresponding manner the deflecting body 3 is connected to the pulley 5 via a further pin 13, which likewise transitions in one piece to the central piece 2 of the threaded nut 1. Hence, the deflecting body 3 is only secured by two pins 13. The same applies for an optional second deflecting body 3, which, with reference to the arrangement according to FIGS. 1 to 5, is to be secured on the underside of the threaded nut 1. A second deflecting body 3 is necessary if the spindle drive is designed as a multiple-start ball screw drive.

Figure 2:
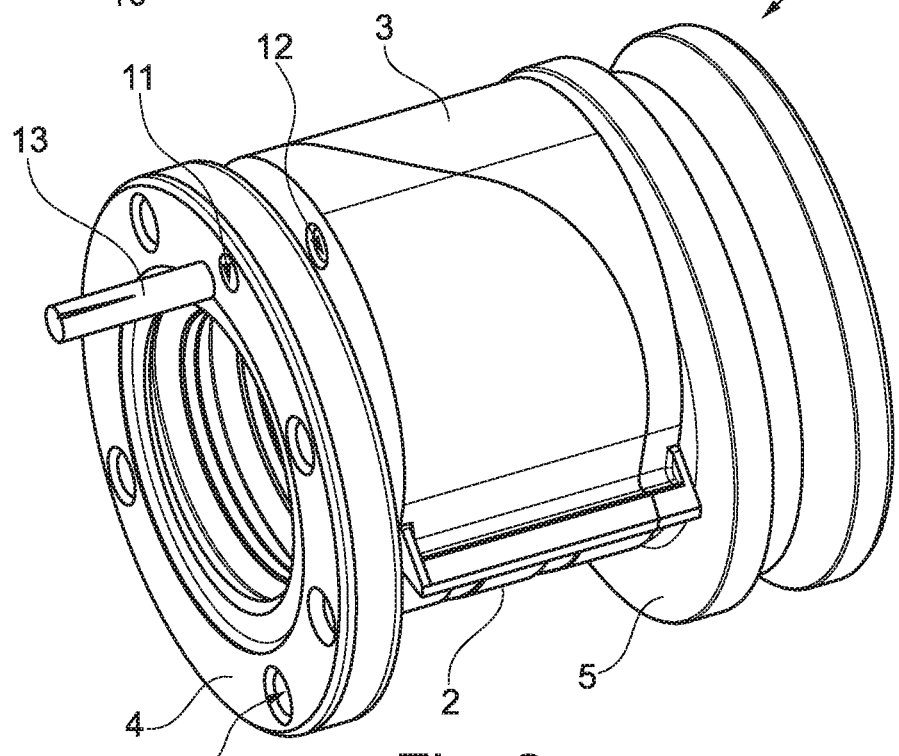
Figure 3:
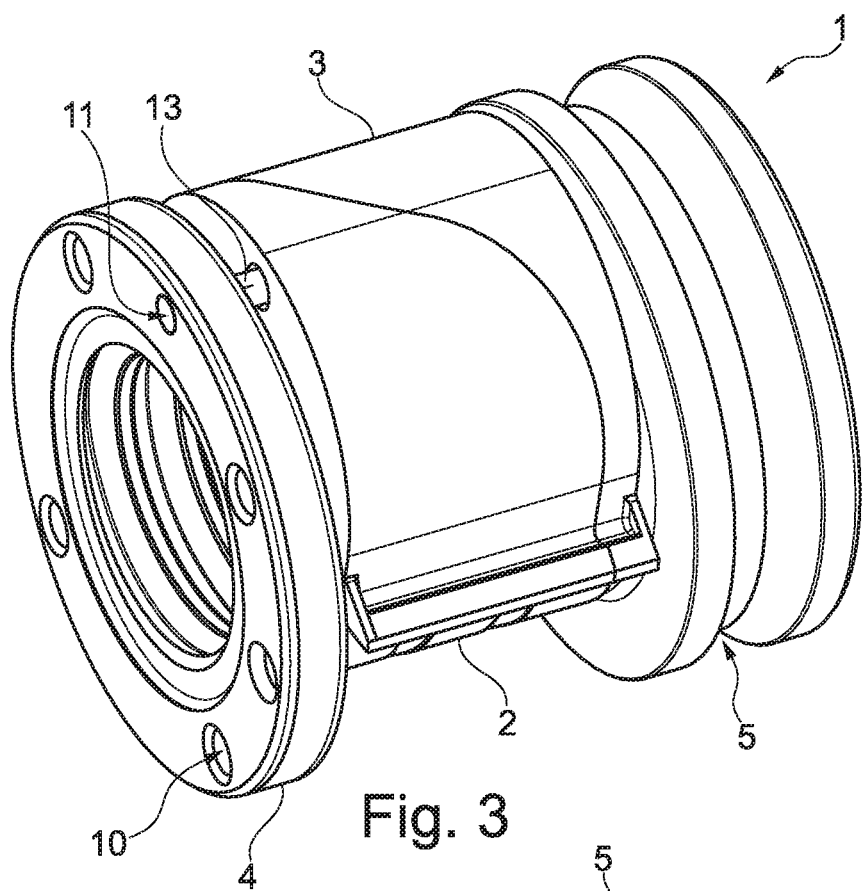

In the design according to FIGS. 1 to 3, the recess 12 in the deflecting body 3 is a bore. The pin 13, which is to be inserted into the locking bore 11 and the bore 12, as is evident from FIG. 2, can be designed as a parallel-grooved pin. The bore 12 is located, viewed in the circumferential direction of the deflecting body 3, centrally between its two borders.

Figure 4:
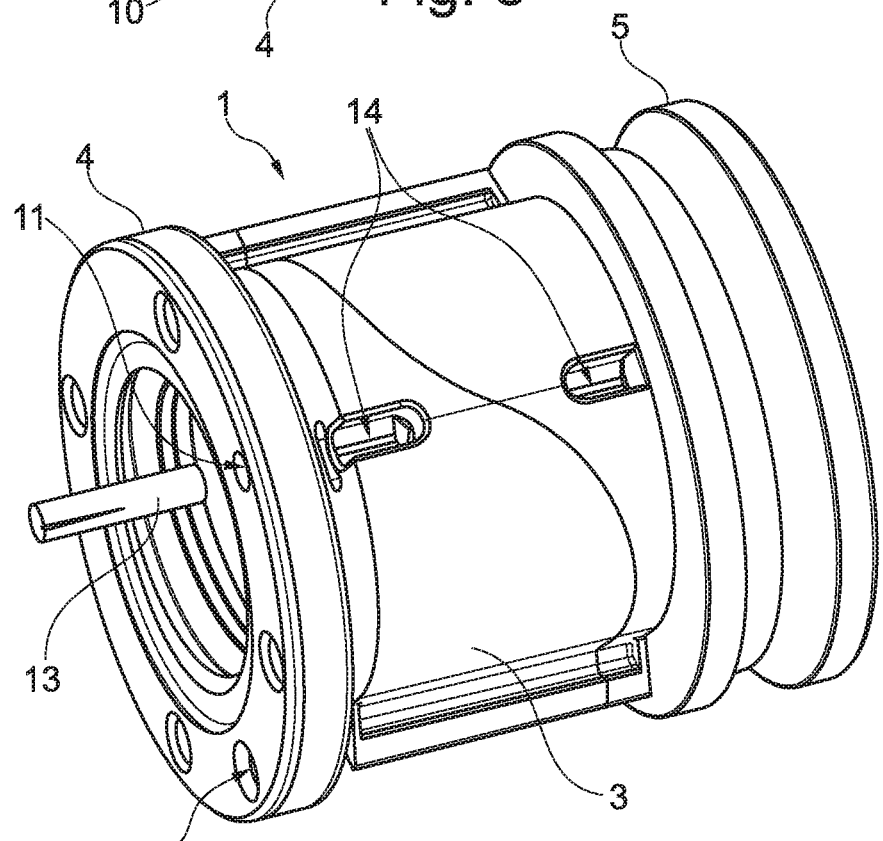
FIGS. 4 & 5 show a second exemplary embodiment of a threaded nut.
Figure 5:
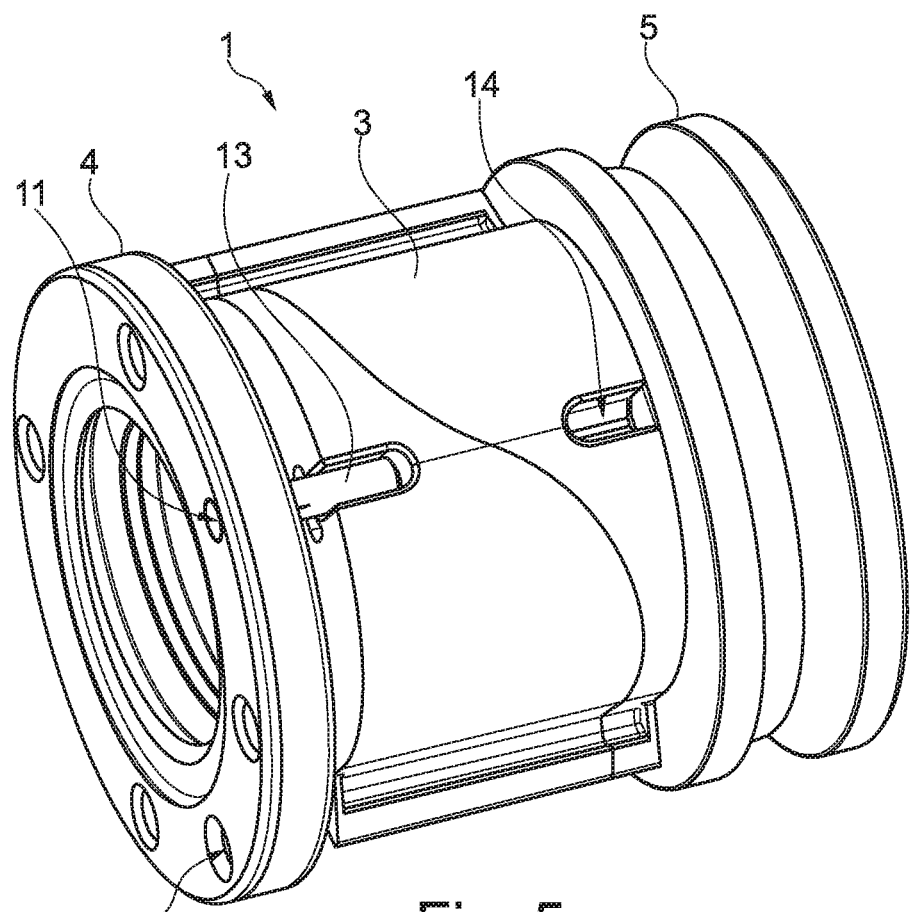
Figure 6:
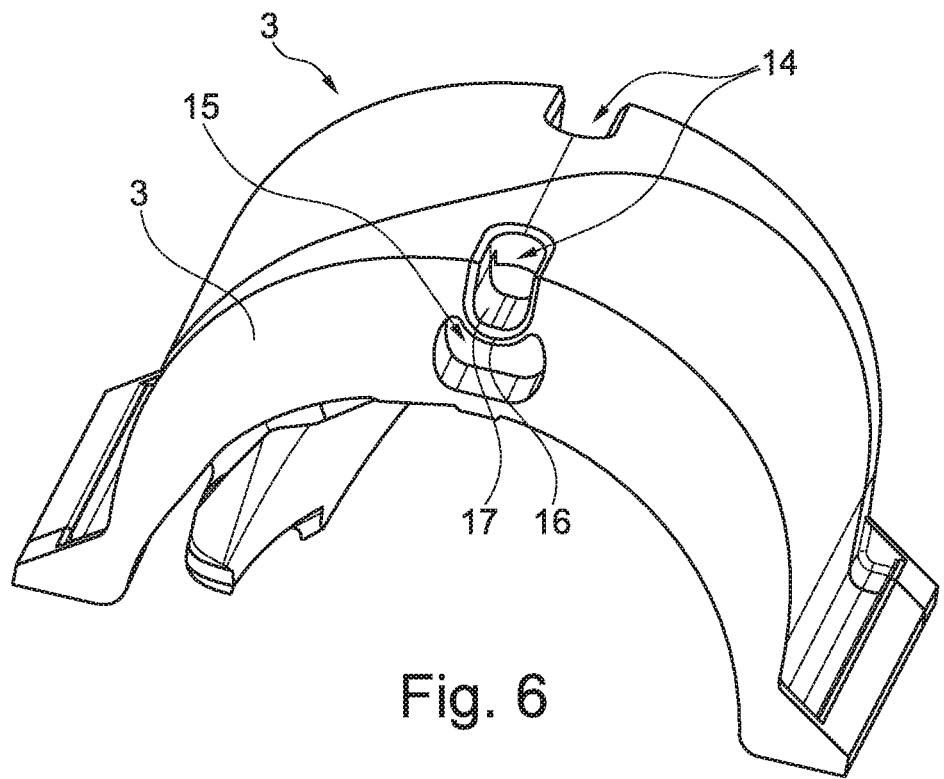
FIG. 6 shows a deflection piece of the threaded nut according to FIG. 4.

In the exemplary embodiment according to FIGS. 4 to 6 the recess 14, which in this case is designed as a groove, is likewise arranged in the center of the deflecting body 3. Likewise, the pin 13 can also be designed as a parallel-grooved pin. The shape of the groove 14, which is open to the lateral surface of the deflecting body 3, can be seen in detail from FIG. 6. The groove 14 is somewhat spaced apart from the front side of the deflecting body 3 striking the flange 4, wherein between the front side of the flange 4 and the groove 14 a notch 15, approximately kidney-shaped in cross-section is located, which is formed by the deflecting body 3.

The notch 15 is wider in the circumferential direction than the groove 14 and reaches closer to the rotational axis of the threaded nut 1 than the groove 14, wherein a shoulder between the notch 15 and the groove 14 is labeled 16. In other words: the notch 15 is cut deeper into the deflecting body 3 and the groove 14, whose groove base is labeled 17. This configuration ensures that a section of the pin 13 exists in which it is open between the locking bore 11 and the groove 14. This section, into which the pin 13 is guided neither through the flange 4 nor through the deflecting body 3, depicts a spring section of the pin 13. In this way the deflecting body 3 is spring mounted within the threaded nut 1. Any deflections which the deflecting body 3 undergoes during the operation of the ball screw drive are so slight that the function of the ball recirculation is not adversely affected by it.

Figure 7:
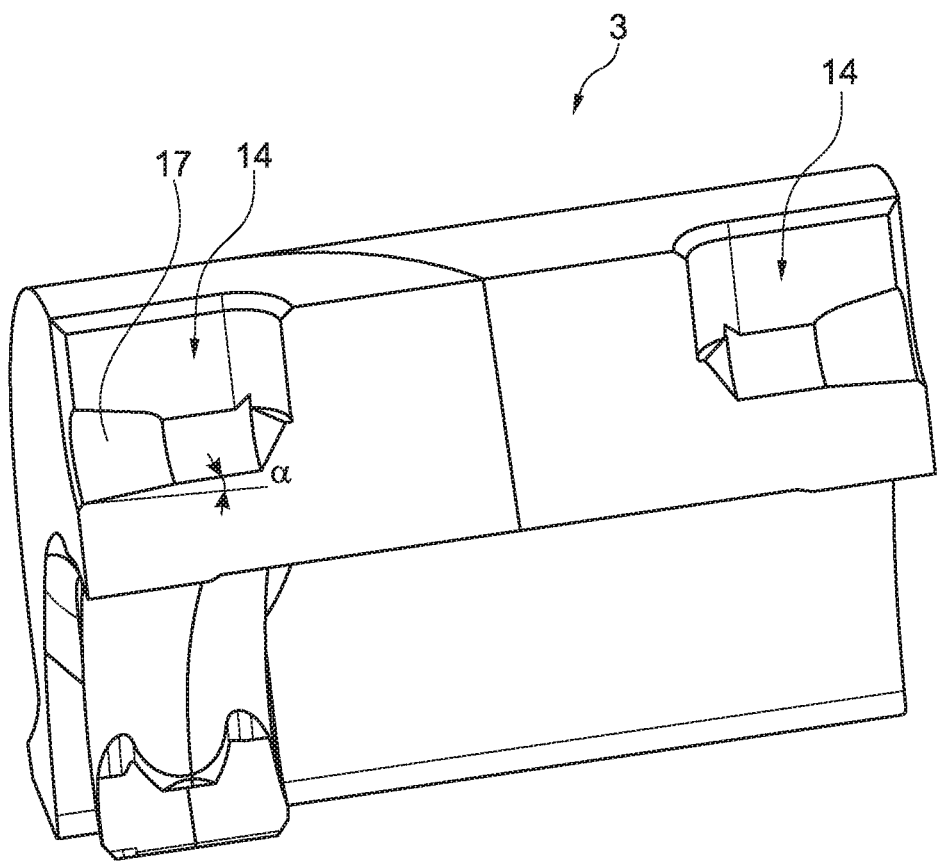
FIG. 7 shows a modified design of a deflection piece in sections.

FIG. 7 shows a modified configuration of the groove 14 in the deflecting body 3. In this case the groove base 17 is conically shaped, wherein a corresponding angle, which specifies the angle of the taper, is labeled α in FIG. 7. The conical shape of the groove base 17 ensures a bracing of the pin 13 on the deflecting body 3, wherein comparable to the exemplary embodiment according to FIGS. 4 to 6, the pin 13 does not contact the deflecting body 3 with its full length protruding from the flange 4. The deflecting body 3 of the threaded nut 1 is made of plastic in all of the exemplary embodiments.

REFERENCE LIST

1 Threaded nut
2 Central piece
3 Deflecting body
4 Flange
5 Pulley
6 Thread
7 Ball passage
8 Ball passage
9 Deflection connector
10 Connecting bore
11 Recess, locking bore
12 Recess, bore
13 Pin
14 Recess, groove
15 Notch
16 Shoulder
17 Groove base
α Angle

The invention claimed is:

1. A threaded nut for a ball screw drive, the threaded nut having a deflecting body and a single-piece comprising a central piece and a flange arranged at a first end of the central piece, wherein the deflecting body is spring mounted on the central piece, arranged between the first end and a second end of the central piece, and is configured for recirculation of balls, wherein the flange is aligned and is directly in contact with an outer surface of a front side of the deflecting body,
   a pin having spring section, the pin fixes the deflecting body to the central piece, wherein the pin is inserted in a recess of the flange and a recess of the deflecting body which are mutually aligned.

2. The threaded nut according to claim 1, wherein the recesses are designed as bores in the flange as well as in the deflecting body.

3. The threaded nut according to claim 1, wherein the recess of the deflecting body is configured as a groove in the deflecting body such that the groove is open to a lateral surface of the deflecting body.

4. The threaded nut according to claim 3, wherein the recess of the flange is a bore in the flange, and wherein the front side of the deflecting body has a notch located radially inward of the groove, wherein the notch has an enlarged cross-section in comparison to the groove.

5. The threaded nut according to claim 4, wherein the recess in the deflecting body is shaped at least partially conically.

6. The threaded nut according to claim 1, wherein the pin is a parallel-grooved pin.

7. The threaded nut according to claim 1, wherein the deflecting body has a second front side with a second recess of the deflecting body shaped similarly as the recess of the deflecting body on the front side.

8. The threaded nut according to claim 7, wherein on each front side of the deflecting body precisely one pin is inserted into the deflecting body.

9. The threaded nut according to claim 1, wherein a pulley is molded on the front side of the central piece opposite the flange.

10. The threaded nut according to claim 1, wherein the central piece is encompassed by the deflecting body and additional deflecting bodies, which contact in a circumferential direction of the central piece in a connectionless manner.

11. A threaded nut for a ball screw drive, the threaded nut comprising:
 a single-piece comprising a central piece having a cylindrical surface and a flange extending radially outwardly from a first end of the cylindrical surface, wherein the flange has a first recess;
 a deflecting body attached to outer surface of the cylindrical surface between the first end and a second end of the cylindrical surface and configured to recirculate balls during operation of the threaded nut, wherein the deflecting body has a second recess aligned with the first recess; and
 a pin extending through the first and second recesses wherein the pin fixes the deflecting body to the central piece,
 wherein;
  the flange is in direct contact with an outer surface of a front side of the deflecting body, and
  the second recess is a groove open to a lateral surface of the deflecting body.

12. The threaded nut of claim 11, wherein the first recess is a bore.

13. The threaded nut of claim 11, wherein the deflecting body has a notch located radially inward of the groove, wherein the notch has an enlarged cross-section compared to the groove.

14. The threaded nut of claim 11, wherein the groove is shaped at least partially conically.

15. The threaded nut of claim 11, wherein the pin is a parallel-grooved pin.

16. A threaded nut for a ball screw drive, the threaded nut comprising:
 a central piece having a flange arranged at a first end of the central piece, the flange and central piece constructed from a single piece;
 a first deflecting body; and
 a second deflecting body; and
 the first and second deflecting bodies:
  attached on the central piece;
  arranged between a first end and a second end of the central piece;
  extending circumferentially around the central piece;
  configured for recirculation of balls; and
  the flange is aligned with an outer surface of a front side of each of the first and second deflecting bodies; and
 a first pin:
  configured to fix the first deflecting body to the central piece; and
  inserted in a recess of the flange and a recess of the first deflecting body; and
 a second pin:
  configured to fix the second deflecting body to the central piece; and
  inserted in a recess of the flange and a recess of the second deflecting body; and
 the first and second deflecting bodies configured to abut each other in a circumferential direction without being coupled to each other in a circumferential direction.

17. The threaded nut according to claim 16, wherein the first and second pins are parallel-grooved pins.

* * * * *